United States Patent Office

3,421,337
Patented Jan. 14, 1969

3,421,337
REVERSE CYCLE REFRIGERATION SYSTEM
Robert A. Johannsen, Onalaska, Wis., assignor to The Trane Company, La Crosse, Wis., a corporation of Wisconsin
Filed July 17, 1967, Ser. No. 653,730
U.S. Cl. 62—115          6 Claims
Int. Cl. F25b 13/00

ABSTRACT OF THE DISCLOSURE

A reverse cycle refrigeration system using a variable orifice superheat responsive thermal expansion valve and a capillary tube arranged in parallel relation to throttle refrigerant liquid into an outdoor heat exchanger at a rate maintaining at the outlet thereof an acceptable degree of superheat over a wide range of outdoor temperatures and the method of operating the same

Summary of the invention

Figure 1:
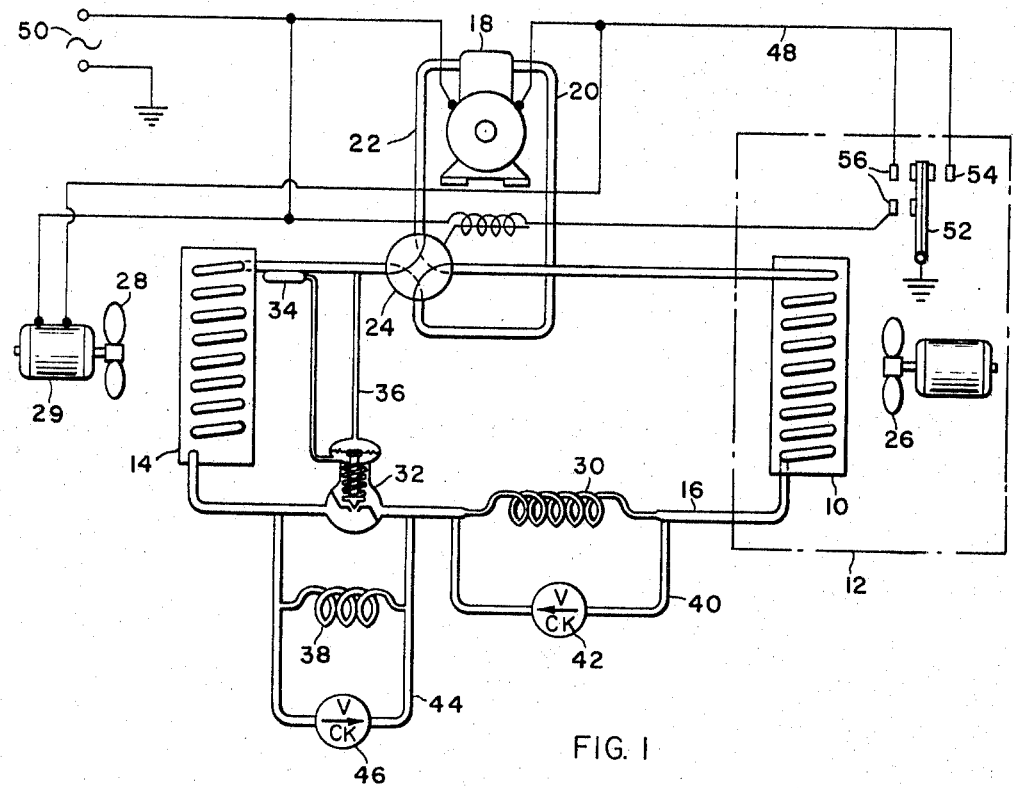

This invention relates to vapor compression refrigeration systems of the reversible cycle type and the apparatus and method for operating the same particularly during the reverse cycle. A refrigeration system to which this invention pertains has an outdoor heat exchanger, an indoor heat exchanger, a refrigerant compressor and a refrigerant throttling means arranged in a closed refrigerant circuit. When operated on the heating cycle, the outdoor heat exchanger functions as an evaporator while the indoor heat exchanger functions as a condenser. When operated on the cooling cycle, the outdoor heat exchanger functions as a condenser while the indoor heat exchanger functions as an evaporator. During both heating and cooling cycles, the outdoor heat exchanger may be subjected to wide variations in atmospheric air temperature while the indoor heat exchanger is subjected to only small variations in air temperature.

These variations in outdoor air temperature during the cooling cycle produce many problems relating to head pressure control for which numerous solutions have been found and patented. On the other hand, when the system is operated on the reverse or heating cycle, the head pressure control problem is absent owing to the relatively steady indoor or condenser temperature. However, unlike the conventional refrigeration system evaporator which is heat exchanged with a temperature controlled conditioned space, be it high or low in temperature, the reverse cycle outdoor evaporator is subjected to wide variations in temperature from below 0° F. to about 70° F. which cause wide variations in suction pressure. Such operating variations make it extremely difficult to properly control the amount of liquid refrigerant entering the outdoor heat exchanger so as to preclude evaporator starvation and compressor slugging.

Thus, it is an object of this invention to provide a reverse cycle refrigeration system with refrigerant flow control means for the outdoor heat exhanger which will prevent compressor slugging and outdoor evaporator starvation over a wide range of outdoor evaporator temperature and pressure conditions.

It is another object of this invention to provide a method and apparatus for effectively controlling the superheat of the suction gas leaving the outdoor evaporator despite wide variations in outdoor temperature.

It is a general object of this invention to provide apparatus and method for controlling the flow of refrigerant in a reverse cycle refrigeration system such that during a wide variation in wet and dry bulb air temperatures at the outdoor evaporator, the superheat of the suction gas leaving the outdoor evaporator and the discharge gas temperature leaving the compressor are maintained at levels compatible with reliable system operation.

In particular, this invention will maintain a relatively constant and acceptable degree of superheat at the outlet of the outdoor evaporator and a relatively constant and acceptable compressor discharge gas temperature when used on the heating cycle of a heat pump system while the outdoor temperature conditions vary from 0° F. to 70° F. and the indoor conditions are maintained at some temperature equal to or higher than the outside temperature.

This invention involves a reverse cycle refrigeration system comprising: an indoor heat exchanger; an outdoor heat exchanger; liquid conduit means for carrying liquid refrigerant connecting said indoor heat exchanger to said outdoor heat exchanger; a compressor having a suction line and a discharge line; reversing means connected to said discharge and suction lines to reversibly connect said discharge and suction lines to said heat exchangers for effecting flow of refrigerant through said system in either direction whereby said system may be operated on a cooling cycle with the outdoor heat exchanger functioning as a condenser and the indoor heat exchanger functioning as an evaporator or on a heating cycle with the outdoor heat exchanger functioning as an evaporator and the indoor heat exchanger functioning as a condenser; a first throttling means in said liquid conduit means for throttling liquid refrigerant at reduced pressure into said indoor heat exchanger during the cooling cycle; a variable orifice expansion valve means in said liquid conduit means for throttling liquid refrigerant at reduced pressure into said outdoor heat exchanger during the heating cycle when the outdoor temperature is relatively high; and a capillary tube means arranged in parallel flow relation with said expansion valve for throttling liquid refrigerant at reduced pressure into said outdoor heat exchanger during the heating cycle when the outdoor temperature is relatively low.

This invention further involves a method of operating a reverse cycle refrigeration system having an outdoor heat exchanger heated by atmospheric air which air may vary in temperature from a first temperature substantially above 32° F. to a second temperature substantially below 32° F., an indoor heat exchanger cooled by indoor air of substantially uniform temperature, a refrigerant compressor arranged to circulate refrigerant gas from the outdoor heat exchanger to the indoor heat exchanger, and a variable orifice thermal expansion valve means and a capillary tube means disposed in parallel flow relation with each other for throttling refrigerant liquid from the indoor heat exchanger to a lower pressure in the outdoor heat exchanger comprising the steps of: passing over said indoor heat exchanger air of substantially uniform temperature to be heated thereby; passing over said outdoor heat exchanger atmospheric air varying substantially in temperature between said first and said second temperatures; passing liquid refrigerant to said outdoor heat exchanger predominantly via said variable orifice thermostatic expansion valve throttling means as said atmospheric air approximates said first temperature; and passing liquid refrigerant to said outdoor heat exchanger predominantly via said capillary tube throttling means as said atmospheric air approximates said second temperature.

Figure 2:
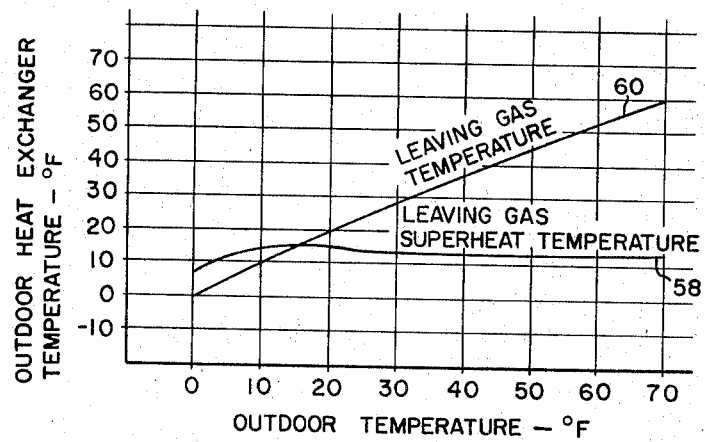

Other objects and advantages will become apparent as this specification proceeds to describe the invention in detail with reference to the accompanying drawing in which:

FIGURE 1 is a schematic of a reverse cycle refrigeration system embodying the instant invention; and
FIGURE 2 is a graph showing the variation in outdoor heat exchanger leaving gas temperature and superheat as related to outdoor ambient dry bulb air temperature variations for the system shown in FIGURE 1 constructed and operated in accordance with the teachings of this invention.

Now with reference to FIGURE 1 a reversible cycle refrigeration system is shown including an indoor heat exchanger 10 disposed in heat exchange relation with a conditioned space 12, an outdoor heat exchanger 14 arranged to transfer heat to or from the outdoor air, a liquid conduit means 16 for carrying liquid refrigerant connecting said indoor heat exchanger to said outdoor heat exchanger, a compressor 18 having a suction line 20 and a discharge line 22, a four-way solenoid operated reversing valve 24 connected to said discharge and suction lines to reversibly connect discharge line 22 and suction line 20 to heat exchangers 10 and 14 for effecting flow of refrigerant through said system in either direction. Indoor heat exchanger 10 is provided with fan 26 for passing relatively constant temperature indoor air over the indoor heat exchanger. Outdoor heat exchanger 14 is provided with fan 28 driven by motor 29 for passing thereover outdoor air which may vary in temperature from 0° F. to 70° F.

Liquid line 16 has a capillary tube 30 in series therewith for throttling liquid refrigerant from outdoor heat exchanger 14 to indoor heat exchanger 10 during cooling cycle operation.

Liquid line 16 has a variable orifice superheat responsive thermal expansion valve 32 in series therewith for throttling liquid refrigerant from indoor heat exchanger 10 to outdoor heat exchanger 14 in response to the degree of refrigerant superheat at the compressor side of the outdoor heat exchanger during the heating cycle. Valve 32 has a remote temperature sensing bulb 34 connected to sense the temperature at the refrigerant gas outlet of the outdoor heat exchanger during the heating cycle. Further valve 32 has an external equalizer line 36 connected to sense refrigerant pressure at the refrigerant gas outlet of the outdoor heat exchanger. Under some circumstances the equalizer line may be eliminated and the pressure merely sensed at the valve provided the pressure drop through the heat exchanger is not excessive. The degree of superheat at the refrigerant gas outlet of the outdoor heat exchanger is the difference in temperature sensed by bulb 34 and the saturation temperature corresponding to the pressure sensed through line 36. The mechanical operation of valve 32 is entirely conventional. In the particular example herein described, valve 32 is adjusted to maintain a 12° F. superheat condition at the outdoor heat exchanger refrigerant gas outlet. This is effected by movement of valve 32 toward a closed position when the superheat is low and movement of valve 32 toward an open position when the superheat is high. For purposes of understanding the instant invention it will be appreciated that should valve 32 be fully closed in an attempt to raise the superheat and should the superheat remain below the predetermined value for the valve, the valve will remain closed. In other words the valve raises the superheat by closing and if the valve has already reached its minimum opening, the valve is powerless to raise the superheat to an acceptable level thereby increasing the danger of compressor slugging.

This situation may occur when the expansion valve is subjected to operating conditions which require refrigerant flow control beyond the design range of the valve as when the outdoor heat exchanger functioning as an evaporator is subjected to wide variations in temperature.

Liquid line 16 also has a capillary tube 38 arranged in parallel relation with expansion valve 32 for throttling refrigerant liquid from the indoor heat exchanger to the outdoor heat exchanger during the heating cycle. Capillary tube 38 is sized to obtain the desired superheat, e.g., 7° F., at the gas outlet of the outdoor heat exchanger when the system is subjected to the lowest design operating temperature such as 0° F. The expansion valve 32 is selected slightly undersized for the system in order to make up for the flow through the capillary tube 38 and is adjusted to a slightly higher superheat (12° F.) than that selected for the capillary tube (7° F.).

Liquid line 16 also includes a bypass passage 40 in parallel relation with capillary 30 provided with a check valve 42 for permitting refrigerant liquid to bypass capillary 30 on the heating cycle. Liquid line 16 includes a second bypass passage 44 in parallel relation with capillary 38 and expansion valve 32 provided with a check valve 46 for permitting refrigerant liquid to by-pass valve 32 and capillary 38 on the cooling cycle.

The system disclosed also includes an electric control circuit 48 including an electric power source 50 and a thermostat 52 responsive to the temperature of the conditioned space having a cooling contact 54 and a pair of heating contacts 56.

*Operation*

Assume fan 26 to be operating and circulating air from the conditioned space over the indoor heat exchanger. When the temperature of the conditioned space rises a degree or so above the set point of thermostat 52, thermostat 52 completes circuits by closure of contact 54 through compressor 18 and fan motor 29 to power source 50 energizing the compressor 18 and fan 28. The solenoid operated reversing valve 24 remains de-energized and in the cooling cycle position. Compressor 18 draws refrigerant gas from indoor heat exchanger 10 via valve 24 and delivers compressed refrigerant gas via valve 24 to outdoor heat exchanger 14. The gas is cooled and condensed by heat exchange with air circulated by fan 28. The condensed refrigerant liquid passes through liquid line 16 via bypass passage 44 and capillary 30 to indoor heat exchanger 10 where it is vaporized by heat absorbed from conditioned space 12 and again returned to compressor 18. When the conditioned space is sufficiently cooled, thermostat 52 will interrupt the circuit at contact 54 to terminate operation of the cooling cycle.

When the temperature of the conditioned spaces falls a degree or so below the set point of thermostat 52, the thermostat completes circuits by closure of contacts 56 through solenoid reversing valve 24, motor 29 and compressor 18 thereby energizing compressor 18, fan 28 and reversing valve 24. Valve 24 is energized to the reversing position whereby refrigerant gas is drawn from outdoor heat exchanger 14 and delivered under high pressure to indoor heat exchanger where the refrigerant releases heat to the conditioned space and is thereby condensed. The liquid refrigerant passes via bypass passage 40 and check valve 42 to capillary tube 38 and expansion valve 32. Expansion valve 32 and/or capillary 38 throttle liquid refrigerant into lower pressure outdoor heat exchanger 14 where the refrigerant absorbs heat from the outdoor air via heat exchanger 14 and is vaporized to be returned to compressor 18.

As the outdoor temperature falls, the load on the heating cycle will normally increase due to heat losses from the conditioned space. On the other hand, as the outdoor temperature falls the capacity of the outdoor heat exchanger to vaporize refrigerant decreases. For this reason it is desirable to operate the outdoor heat exchanger in the most efficient manner to obtain maximum capacity at low outdoor temperatures. The invention herein disclosed accomplishes this by providing strict control of the superheat throughout a wide range of outdoor ambient temperature. It further lowers the superheat at the lowest outdoor operating temperatures thus increasing the efficiency of the outdoor evaporator under conditions which demand maximum capacity. These results are brought about by the combined effect of the variable orifice superheat responsive thermal expansion valve 32 and capillary 38 when sized in accordance with the teachings herein and operated with substantially constant head pressure and widely varying evaporator temperature. The combined effect of these throttling means is illustrated in the graph of FIGURE 2. The vertical coordinate of this graph represents temperature in degrees Fahrenheit while the horizontal coordinate represents outdoor dry bulb temperature in degrees Fahrenheit. Curve 58 on the graph shows the superheat at the gas outlet of the outdoor heat exchanger while curve 60 shows the temperature of this gas for the outdoor temperature range of 0° F. to 70° F. when the system of FIGURE 1 is operated on the heating cycle. Note that the curve 58 shows a decreasing superheat from the outdoor temperature of about 15° F. to about 0° F.

It is thought that this change in superheat results because the expansion valve is substantially closed and the flow of refrigerant is predominantly under the control of the capillary tube 38 during low temperature operation. The capillary tube flow control is extremely accurate as it depends simply upon the pressure differential between the condenser and evaporator and has no mechanical moving parts. Since the indoor heat exchanger condenser pressure is substantially constant, the flow through the capillary tube varies inversely with outdoor temperature and permits operation at lower than normal superheat for greater evaporator efficiency at low outdoor temperatures when maximum outdoor evaporator efficiency is most desirable. The capillary tube further extends the useful range of an expansion valve beyond its lowest flow rate and yet does not interfere with its operation at higher outdoor temperatures. This is because the capillary has been selected to provide a lower superheat at 0° F. outdoor ambient than the normal superheat setting of the expansion valve. As the outdoor temperature rises above 0° F. the superheat rises above 7° F. to a value where the expansion valve is the limiting superheat control. Thus the superheat control is effectively shifted from one throttling means to the other provided the capillary is sized to produce a lower superheat at the lowest design temperature than that produced by the expansion valve at higher outdoor temperatures. By this unique shifting of superheat control from capillary to expansion valve and vice versa, the superheat may be effectively controlled over an extremely wide evaporator temperature range in addition to providing for more efficient outdoor evaporator operation at a time when greatest efficiency is needed.

If desired, a control may be provided to prevent operation at outdoor ambient temperatures below the design range of 0° F.

It will be appreciated, however, that the specific design temperatures selected, while typical, are intended to be merely for purposes of illustration and are not intended to suggest limitations on the design of systems constructed in accordance with the teachings of this invention.

Having now described in detail the preferred embodiment of my invention, I contemplate that many changes may be made without departing from the scope or spirit of my invention and I accordingly desire to be limited only by the claims.

I claim:
1. A reverse cycle refrigeration system comprising: an indoor heat exchanger; an outdoor heat exchanger; liquid conduit means for carrying liquid refrigerant connecting said indoor heat exchanger to said outdoor heat exchanger; a compressor having a suction line and a discharge line; reversing means connected to said discharge and suction lines to reversibly connect said discharge and suction lines to said heat exchangers for effecting flow of refrigerant through said system in either direction whereby said system may be operated on a cooling cycle with the outdoor heat exchanger functioning as a condenser and the indoor heat exchanger functioning as an evaporator or on a heating cycle with the outdoor heat exchanger functioning as an evaporator and the indoor heat exchanger functioning as a condenser; a first throttling means in said liquid conduit means for throttling liquid refrigerant at reduced pressure into said indoor heat exchanger during the cooling cycle; a variable orifice expansion valve means in said liquid conduit means for throttling liquid refrigerant at reduced pressure into said outdoor heat exchanger during the heating cycle when the outdoor temperature is relatively high; and a capillary tube means arranged in parallel flow relation with said expansion valve means for throttling liquid refrigerant at reduced pressure into said outdoor heat exchanger during the heating cycle when the outdoor temperature is relatively low.

2. A reverse cycle refrigeration system comprising: an indoor heat exchanger; an outdoor heat exchanger; liquid conduit means for carrying liquid refrigerant connecting said indoor heat exchanger to said outdoor heat exchanger; a compressor having a suction line and a discharge line; reversing means connected to said discharge and suction lines to reversibly connect said discharge and suction lines to said heat exchangers for effecting flow of refrigerant through said system in either direction whereby said system may be operated on a cooling cycle with the outdoor heat exchanger functioning as a condenser and the indoor heat exchanger functioning as an evaporator or on a heating cycle with the outdoor heat exchanger functioning as an evaporator and the indoor heat exchanger functioning as a condenser; a first throttling means in said liquid conduit means for throttling liquid refrigerant at reduced pressure into said indoor heat exchanger during the cooling cycle; valve means in said liquid conduit for varying the liquid refrigerant flow from said indoor heat exchanger to said outdoor heat exchanger in response to the degree of refrigerant superheat in said suction line adjacent said outdoor heat exchanger to thereby limit the refrigerant superheat at said outdoor heat exchanger to a first value during the heating cycle when the outdoor temperature is relatively high; and a capillary tube means arranged in parallel flow relation with said valve means and sized to produce a second value refrigerant superheat in said suction line at said outdoor heat exchanger lower than said first value during the heating cycle when the outdoor temperature is relatively low.

3. The system as defined by claim 2 including a bypass conduit arranged to bypass refrigerant around said expansion valve and check valve means in said bypass conduit for checking the flow of refrigerant in a direction from said indoor heat exchanger to said outdoor heat exchanger.

4. The system as defined by claim 3 including a second bypass conduit arranged to bypass refrigerant around said first throttling means and a second check valve means in said second bypass conduit for checking the flow of refrigerant in a direction from said outdoor heat exchanger to said indoor heat exchanger.

5. A method of operating a reverse cycle refrigeration system having an outdoor heat exchanger heated by atmospheric air which air may vary in temperature from a first temperature substantially above 32° F. to a second temperature substantially below 32° F., an indoor heat exchanger cooled by indoor air of substantially uniform temperature, a refrigerant compressor arranged to circulate refrigerant gas from the outdoor heat exchanger to the indoor heat exchange, and a variable orifice thermal expansion valve means and a capillary tube means disposed in parallel flow relation with each other for throttling refrigerant liquid from the indoor heat exchanger to a lower pressure in the outdoor heat exchanger comprising the steps of: passing over said indoor heat exchanger air of substantially uniform temperature to be heated thereby; passing over said outdoor heat exchanger atmospheric air varying substantially in temperature between said first and said second temperatures; passing liquid refrigerant to said outdoor heat exchanger predominantly via said variable orifice thermostatic expansion valve throttling means as said atmospheric air approximates said first temperature; and passing liquid refrigerant to said outdoor heat exchanger predominantly via said capillary tube throttling means as said atmospheric air approximates said second temperature.

6. A method of operating a reverse cycle refrigeration system having an outdoor heat exchanger heated by atmospheric air which may vary in temperature from a first temperature substantially above 32° F. to a second temperature substantially below 32° F., an indoor heat exchanger cooled by indoor air of substantially uniform temperature, a refrigerant compressor arranged to circulate refrigerant gas from the outdoor heat exchanger to the indoor heat exchanger, and a variable orifice thermal expansion valve means and a capillary tube means disposed in parallel flow relation with each other for comprising the steps of: passing over said indoor heat exchanger to a lower pressure in the outdoor heat exchanger comprising the steps of: passing over said indoor heat exchanger air of substantially uniform temperature to be heated thereby; passing over said outdoor heat exchanger atmospheric air varying substantially in temperature between said first and said second temperatures; limiting the refrigerant superheat at the outlet of said outdoor heat exchanger to a first value via said variable orifice thermal expansion valve means as said atmospheric air approximates said first temperature and limiting the refrigerant superheat at the outlet of said outdoor heat exchanger to a second value lower than said first value via said capillary tube throttling means as said atmospheric air approximates said second temperature.

References Cited
UNITED STATES PATENTS

| | | | |
|---|---|---|---|
| 2,860,491 | 11/1958 | Goldenberg | 62—160 |
| 2,934,323 | 4/1960 | Burke | 62—160 |
| 3,164,969 | 1/1965 | Baker | 62—160 |

WILLIAM J. WYE, *Primary Examiner.*

U.S. Cl. X.R.

62—160

UNITED STATES PATENT OFFICE
CERTIFICATE OF CORRECTION

Patent No. 3,421,337                                              January 14, 1969

Robert A. Johannsen

It is certified that error appears in the above identified patent and that said Letters Patent are hereby corrected as shown below:

Column 7, line 17, cancel "comprising the steps of: passing over said" and insert -- throttling refrigerant liquid from the --.

Signed and sealed this 10th day of March 1970.

(SEAL)
Attest:

Edward M. Fletcher, Jr.                        WILLIAM E. SCHUYLER, JR.
Attesting Officer                                       Commissioner of Patents